United States Patent
Sotgiu

(10) Patent No.: US 8,899,111 B2
(45) Date of Patent: Dec. 2, 2014

(54) DEVICE FOR MEASURING FORCES GENERATED BY AN UNBALANCE

(75) Inventor: Paolo Sotgiu, Modena (IT)

(73) Assignee: Snap-On Equipment Srl a Unico Socio, Correggio (IT)

( * ) Notice: Subject to any disclaimer, the term of this patent is extended or adjusted under 35 U.S.C. 154(b) by 922 days.

(21) Appl. No.: 13/072,197

(22) Filed: Mar. 25, 2011

(65) Prior Publication Data

US 2012/0240677 A1 Sep. 27, 2012

(51) Int. Cl.
*G01M 1/16* (2006.01)
*G01M 1/04* (2006.01)

(52) U.S. Cl.
CPC ........................................ *G01M 1/04* (2013.01)
USPC .......................................................... 73/462

(58) Field of Classification Search
CPC ........... G01M 1/02; G01M 1/04; G01M 1/22; G01M 1/045
USPC ....................................... 73/462, 66
See application file for complete search history.

(56) References Cited

U.S. PATENT DOCUMENTS

| | | | |
|---|---|---|---|
| 3,924,473 A | 12/1975 | Maus | |
| 4,052,905 A * | 10/1977 | Brendel et al. | 73/483 |
| 4,193,305 A | 3/1980 | Hunter | |
| 4,494,400 A * | 1/1985 | Hill | 73/1.14 |
| 5,189,912 A * | 3/1993 | Quinlan et al. | 73/462 |
| 6,430,992 B1 * | 8/2002 | Goebel | 73/66 |
| 6,658,936 B2 * | 12/2003 | Matsumoto | 73/460 |
| 6,662,682 B2 * | 12/2003 | Stalsberg | 74/572.4 |
| 8,171,790 B2 * | 5/2012 | Sotgiu | 73/462 |
| 2002/0124650 A1 * | 9/2002 | Matsumoto | 73/460 |
| 2003/0101846 A1 * | 6/2003 | Stalsberg | 74/573 R |
| 2010/0000319 A1 * | 1/2010 | Sotgiu et al. | 73/460 |
| 2011/0001301 A1 * | 1/2011 | Li et al. | 280/124.167 |
| 2013/0042980 A1 * | 2/2013 | Sotgiu | 157/1.24 |

\* cited by examiner

*Primary Examiner* — Peter Macchiarolo
*Assistant Examiner* — Samir M Shah
(74) *Attorney, Agent, or Firm* — McDermott Will & Emery LLP

(57) ABSTRACT

A device for measuring forces generated by an unbalance of a rotor, said device comprising a stationary frame, a first bearing, measuring shaft mounted rotatably about its shaft axis in the first bearing, a mounting means provided on the measuring shaft designed for attachment of the rotor, wherein the rotor is designed to be balanced in at least one compensating plane, a second bearing pivotally supporting the first bearing about a pivot axis which intersects the shaft axis and being supported on the stationary frame, a first force sensor for measuring forces generated by the unbalance of the rotating rotor and acting about the pivot axis, and a second force sensor for measuring forces generated by the unbalance of the rotating rotor and acting on the measuring shaft and on the second bearing in a direction intersecting the shaft axis.

20 Claims, 8 Drawing Sheets

US 8,899,111 B2

DEVICE FOR MEASURING FORCES GENERATED BY AN UNBALANCE

Figure 1:
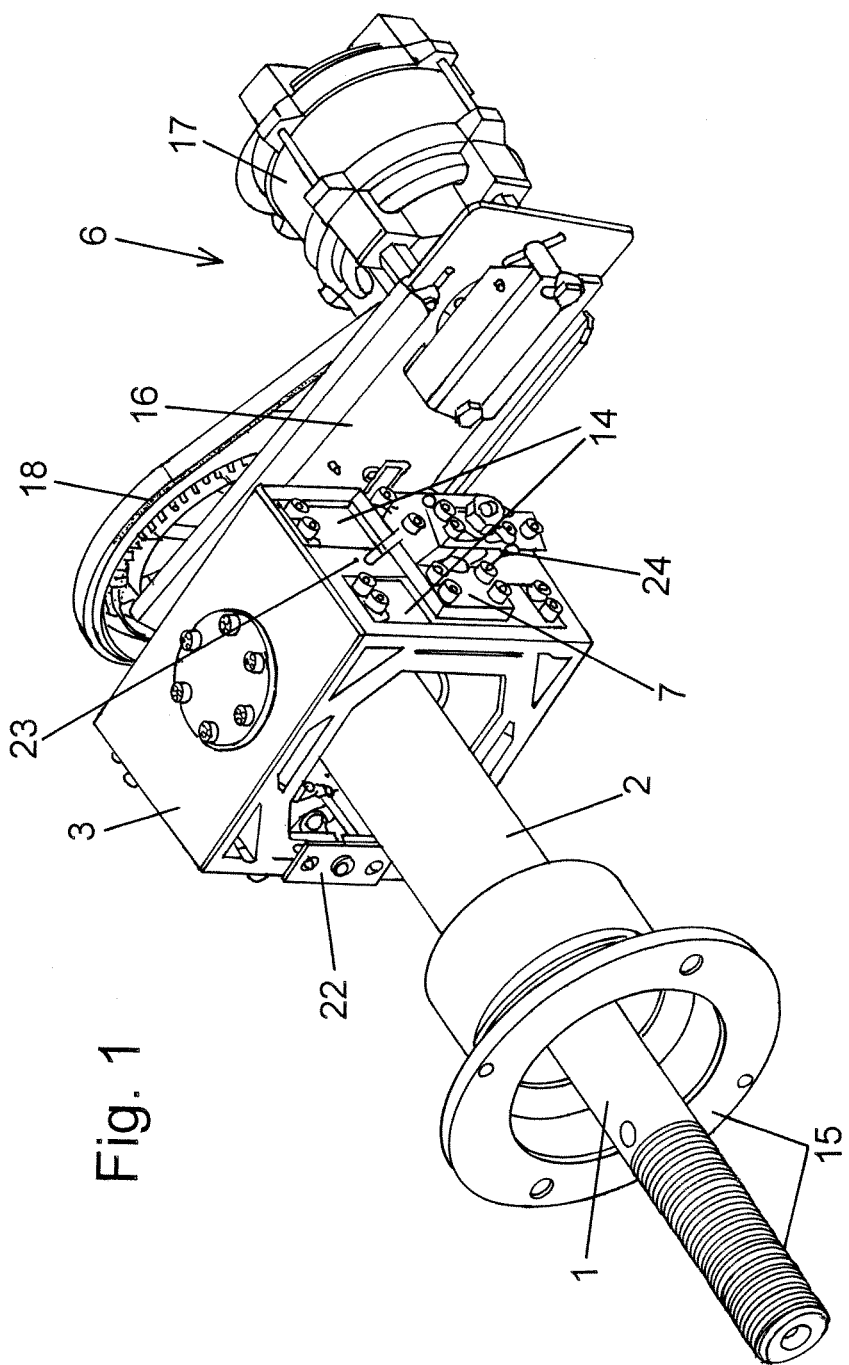

The invention concerns a device for measuring forces generated by an unbalance of a rotor, in particular of a vehicle wheel (rim/tyre assembly).

With such a device for measuring forces that are generated by an unbalance of a rotor, it is known from U.S. Pat. No. 4,449,407 to mount the measuring shaft rotating in two bearing units arranged at an axial distance from each other and supported via force sensors opposite a hollow bearing housing. This measuring shaft mounting is borne by a stationary frame.

In a device known from EP 0 133 229 A1 used for balancing motor vehicle wheels, the measuring shaft is supported on a stationary frame in a mounting that to has force transmitters. To achieve a dynamic balancing, two mounting planes in which the force transducers are also arranged are provided for the mounting of the measuring shaft.

The force sensors provided in known devices in the mounting planes at the measuring points supply sensor signals that are proportional to the centrifugal forces that result from the rotor unbalance. With the conventional standard measuring systems for wheel balancing machines, a floating mounting is typical for the measuring shaft and the rotor clamped onto it. Translation onto the two compensating planes on the rotor for the dynamic balancing of the unbalance takes place based on the force lever law of statics. The known devices disclose structures and calibration methods with the aim that the measurements of the forces in the two mounting planes by the sensors are independent from each other (plane separation).

The technical problem of the invention is to provide a device of the type mentioned in the beginning in which, due to the force dynamics, an improved plane separation is achieved.

According to the invention the problem is solved by the features of claim 1. The sub-claims include favourable modifications of the invention.

The invention provides a device for measuring forces generated by an unbalance of a rotor, especially a tyre service machine, such as for instance a wheel balancer adapted for balancing vehicle wheels and/or a tyre changing machine. The device comprises a stationary frame and a first bearing, preferably in form of a tube, in which a measuring shaft is mounted rotatably about its shaft axis.

The measuring shaft has close to or at the free end mounting means designed for attachment of the rotor, for instance a vehicle wheel.

The rotor is configured to be balanced in one (static balancing) or in two compensation planes (dynamic balancing). A second bearing having a rigid structure supports pivotally the first bearing about a pivot axis which intersects, preferably perpendicularly, the shaft axis and is supported on the stationary frame. A first force sensor measures forces generated by the rotor unbalance and acting on the measuring shaft about the pivot axis. A second force sensor measures the forces generated by the rotor unbalance and acting on the shaft and on the second bearing in a direction intersecting the shaft axis, such direction preferably being perpendicular to the pivot axis.

The pivotal displacement between the first bearing and the second bearing is enabled by spring means, especially by means of one or more torsion-springs. The displacement between the second bearing and the stationary frame is enabled by spring means which are preferably configured as plate springs. The used spring means permit a displacement needed for the currently available load cells or force transducers to measure forces, for instance in the region of µm-displacement. Such load cells or force transducers can include piezo-crystals or Hall-elements as force-sensible elements.

In order to establish the pivot axis of about which the second bearing is pivotably supported, preferably two torsion springs are provided, wherein the shaft axis extends in the middle between the two torsion springs.

Preferably, the first force sensor is placed, especially tensioned between the first bearing and the second bearing and the second force sensor is placed, especially tensioned between the second bearing and the stationary frame.

The measuring directions of the first force sensor and the second force sensor extend preferably in one common plane which passes through the shaft axis.

The measuring direction of the first force sensor may be inclined with a specific angle with respect to a direction perpendicular to the shaft axis. Such inclination angle can be determined in a range from 80° to 100°, preferably from 85° to 95°. Even more preferably, such inclination angle is 90°, in which case the measuring direction of the first force sensor extends parallel to the shaft axis.

The measuring direction of the second force sensor may be inclined with a specific angle with respect to the shaft axis, wherein the measuring direction of the first force sensor is substantially parallel to the shaft axis. The inclination angle of the measuring direction of the second force sensor with respect to the shaft axis can be determined in a range from 60° to 120°, for instance from 65° to 115°, especially 70° to 110°. In a preferred embodiment, the inclination angle is either 75° or 105°.

Figure 2:
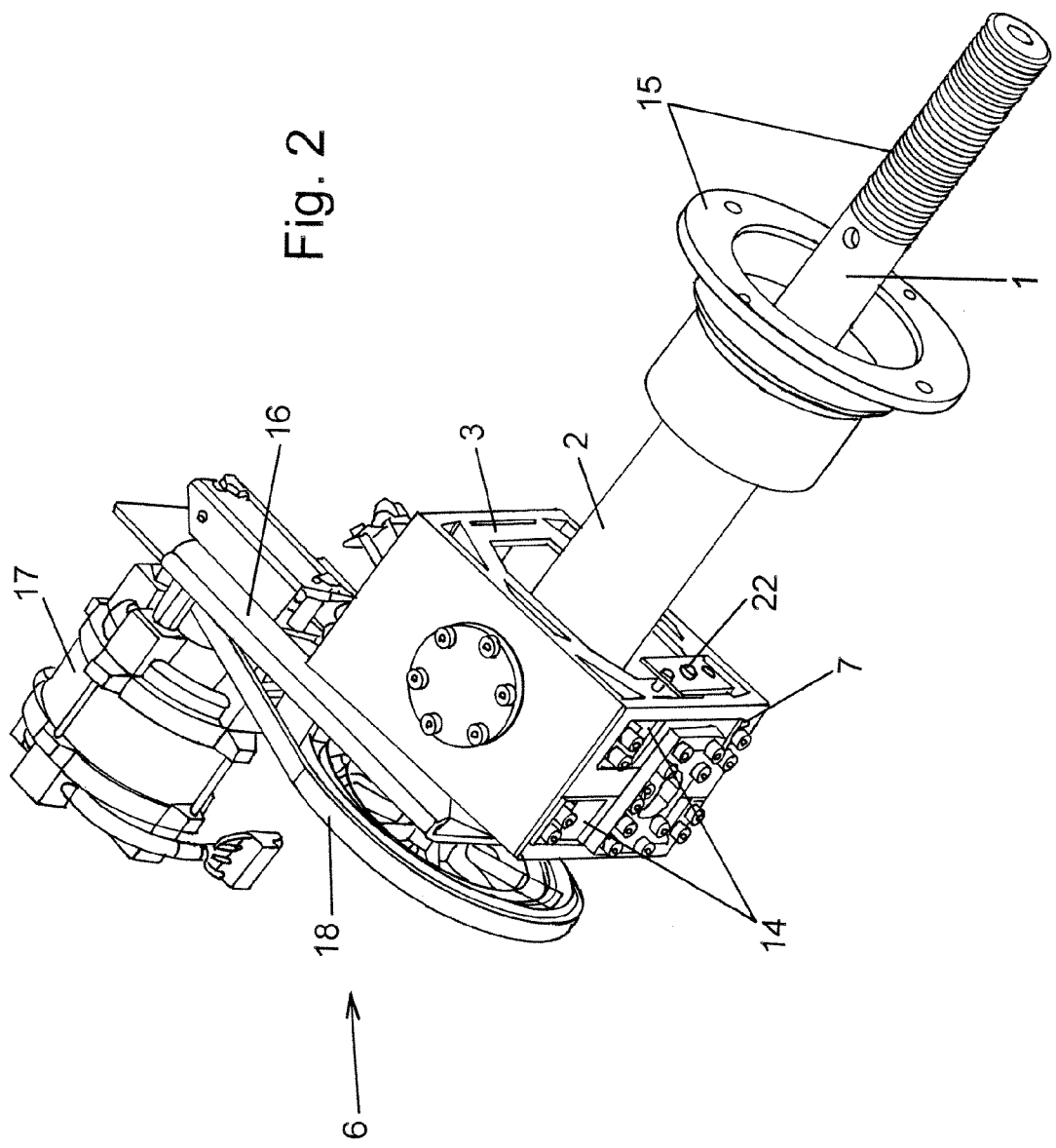
Figure 3:
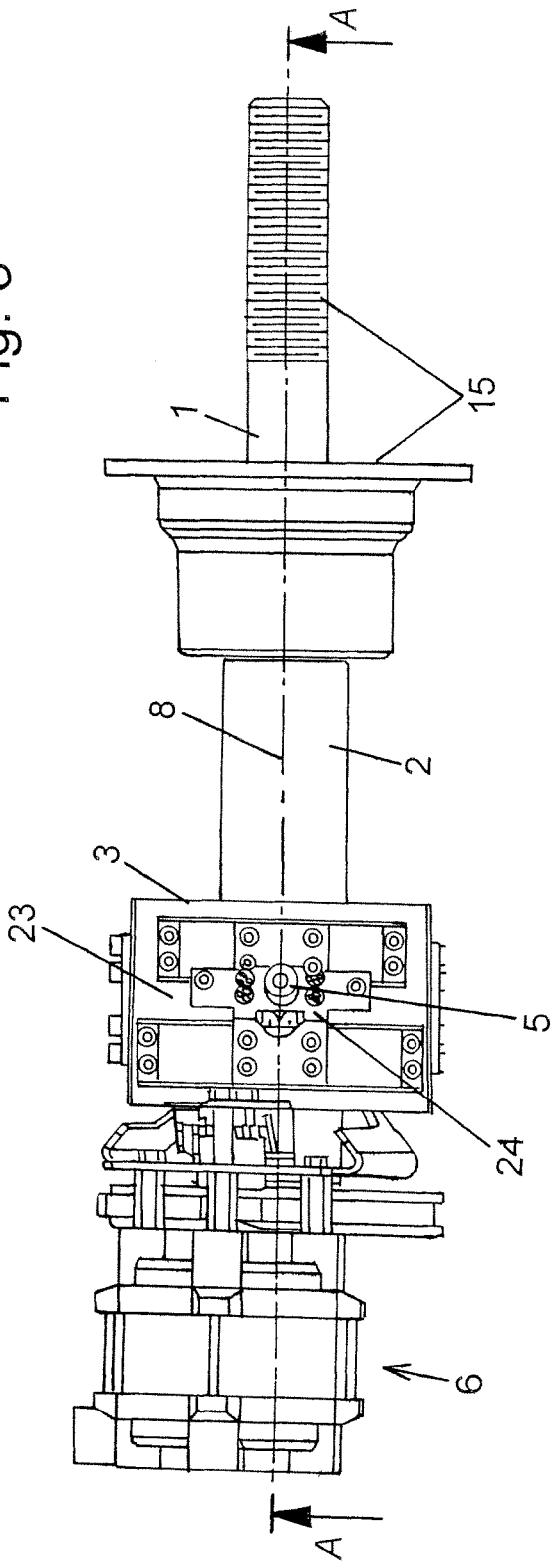
Figure 4:
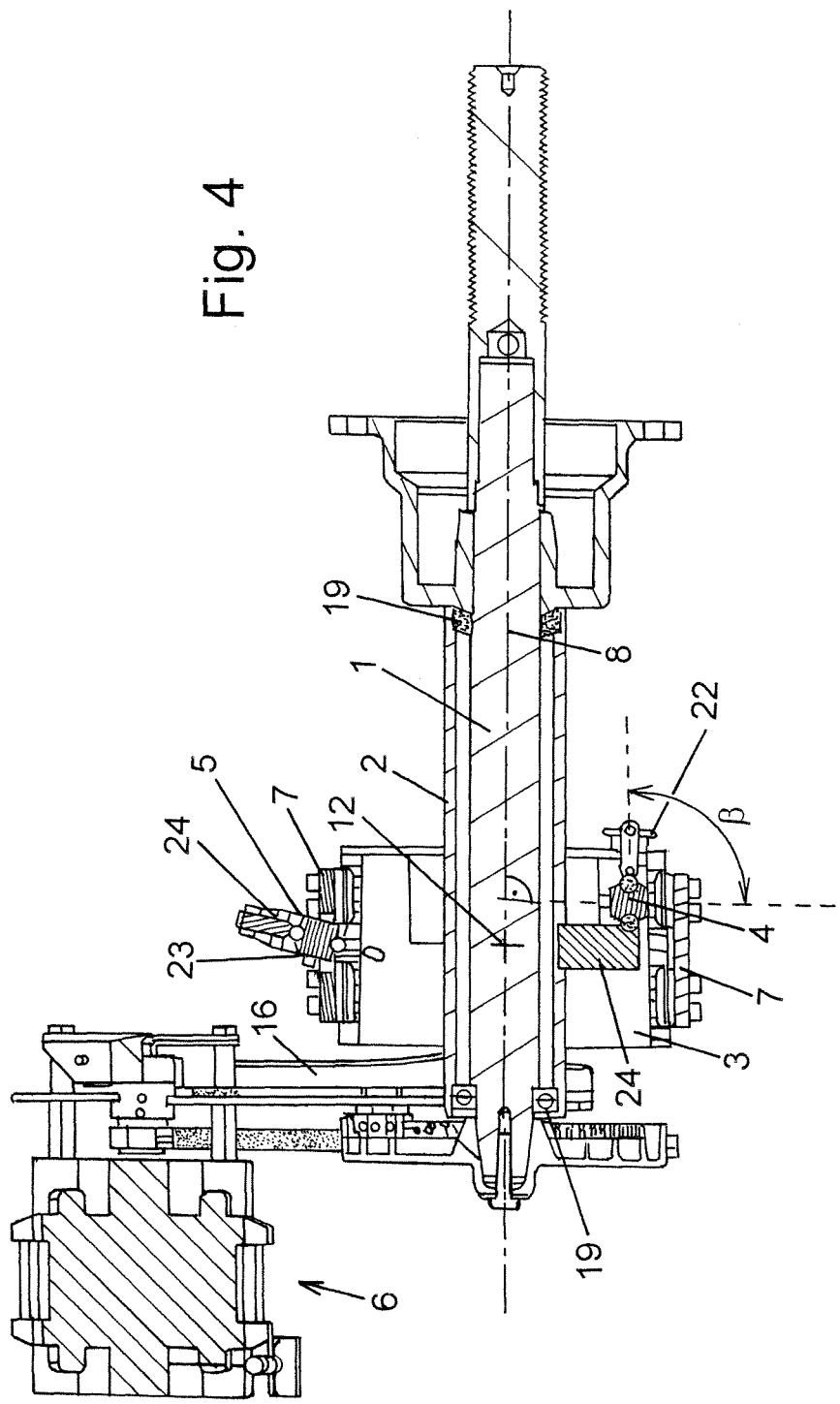
Figure 5:
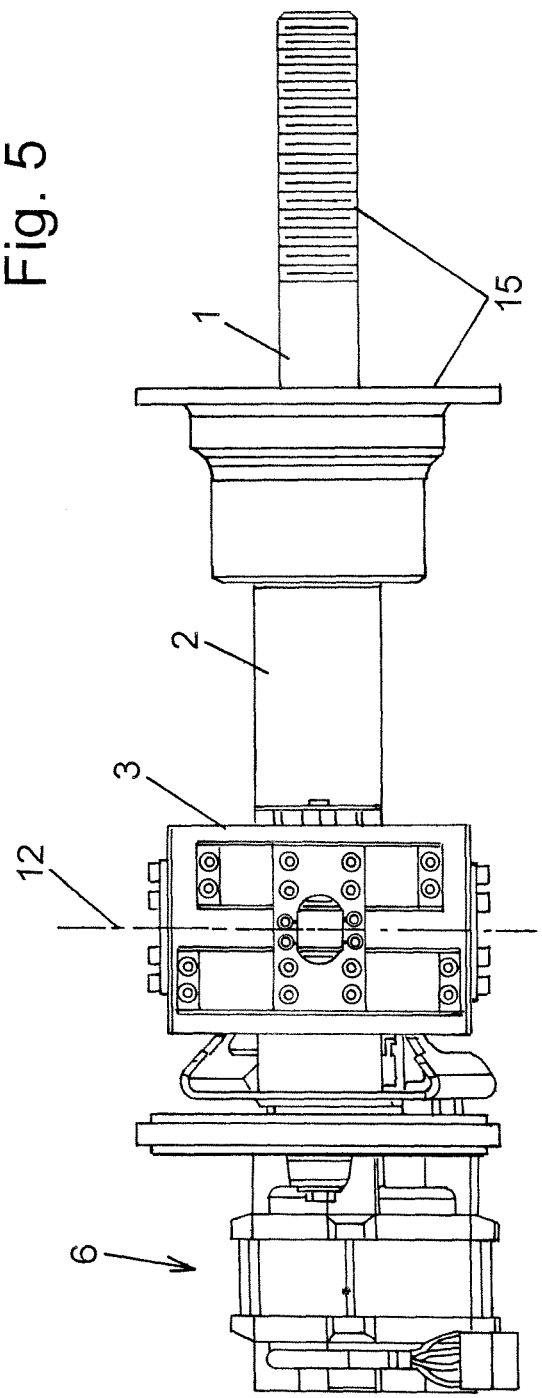
Figure 6:
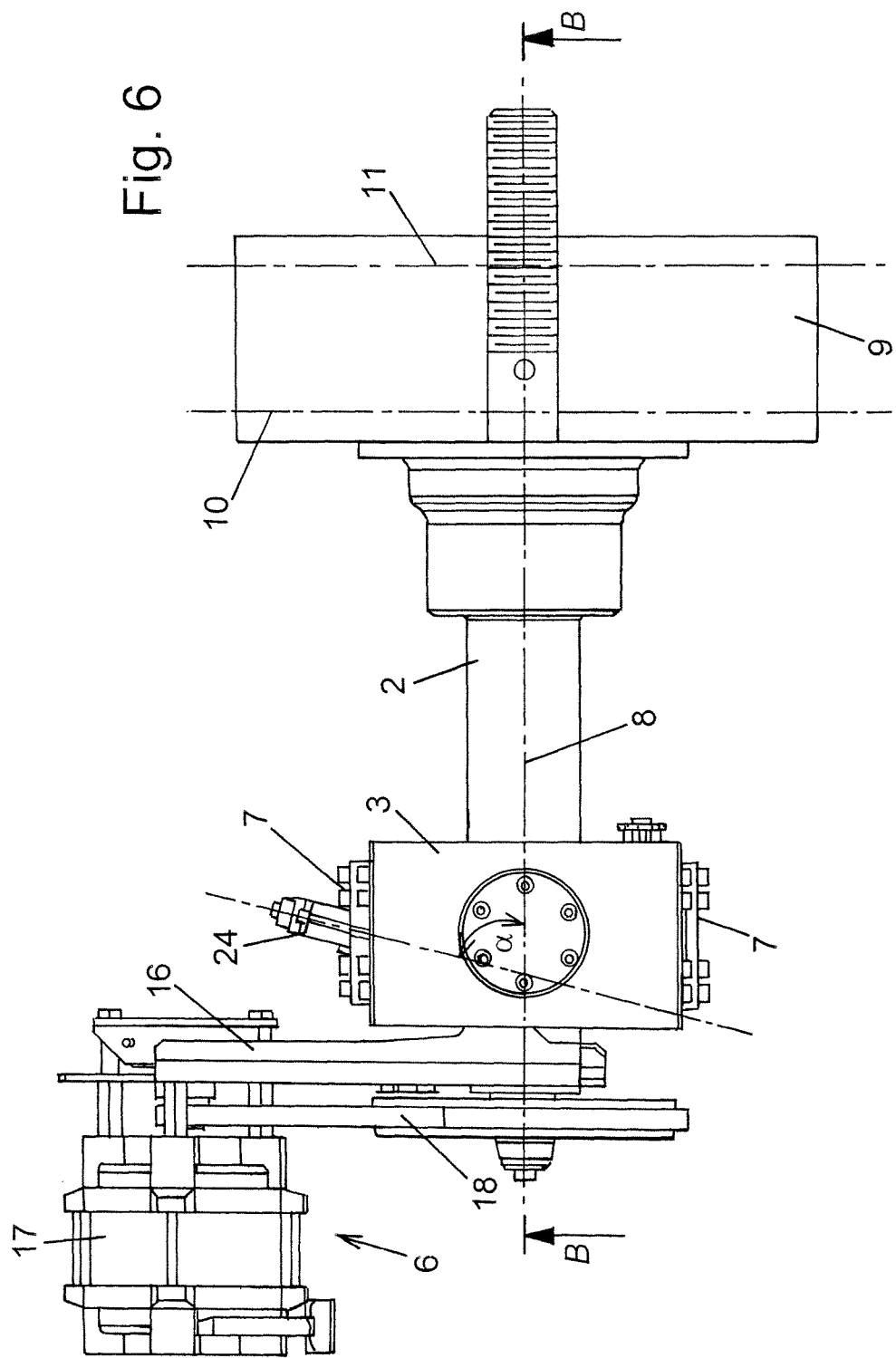
Figure 7:
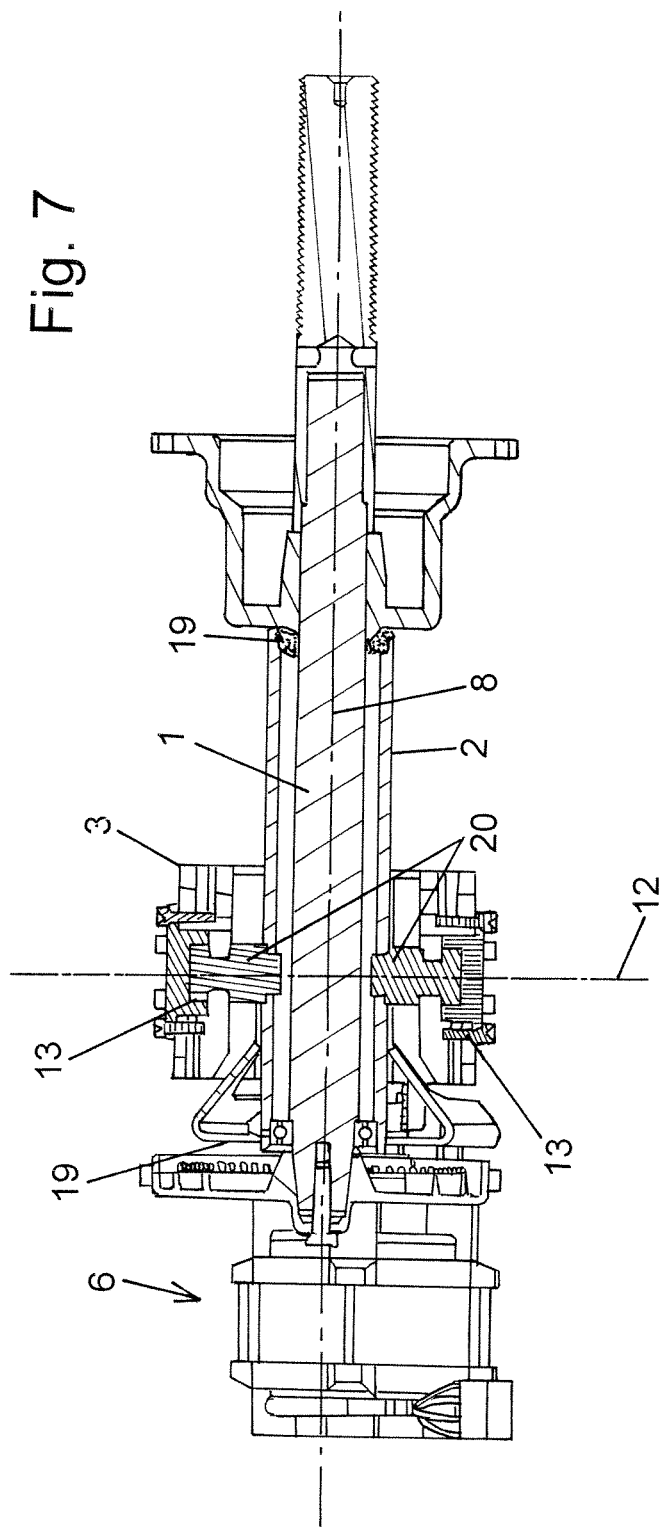

The invention will be explained in more detail in conjunction with a preferred embodiment represented in the drawings which show in FIG. 1 a perspective view of the measuring device from one side;

FIG. 2 a perspective view of the measuring device from the other side;

FIG. 3 a side elevation view of the one side of the measuring device;

FIG. 4 a section view along the section line A-A in FIG. 3;

FIG. 5 a side elevation view of the other side of the measuring device;

FIG. 6 a plan view of the measuring device;

FIG. 7 a section view along the section line B-B in FIG. 6; and

Figure 8:
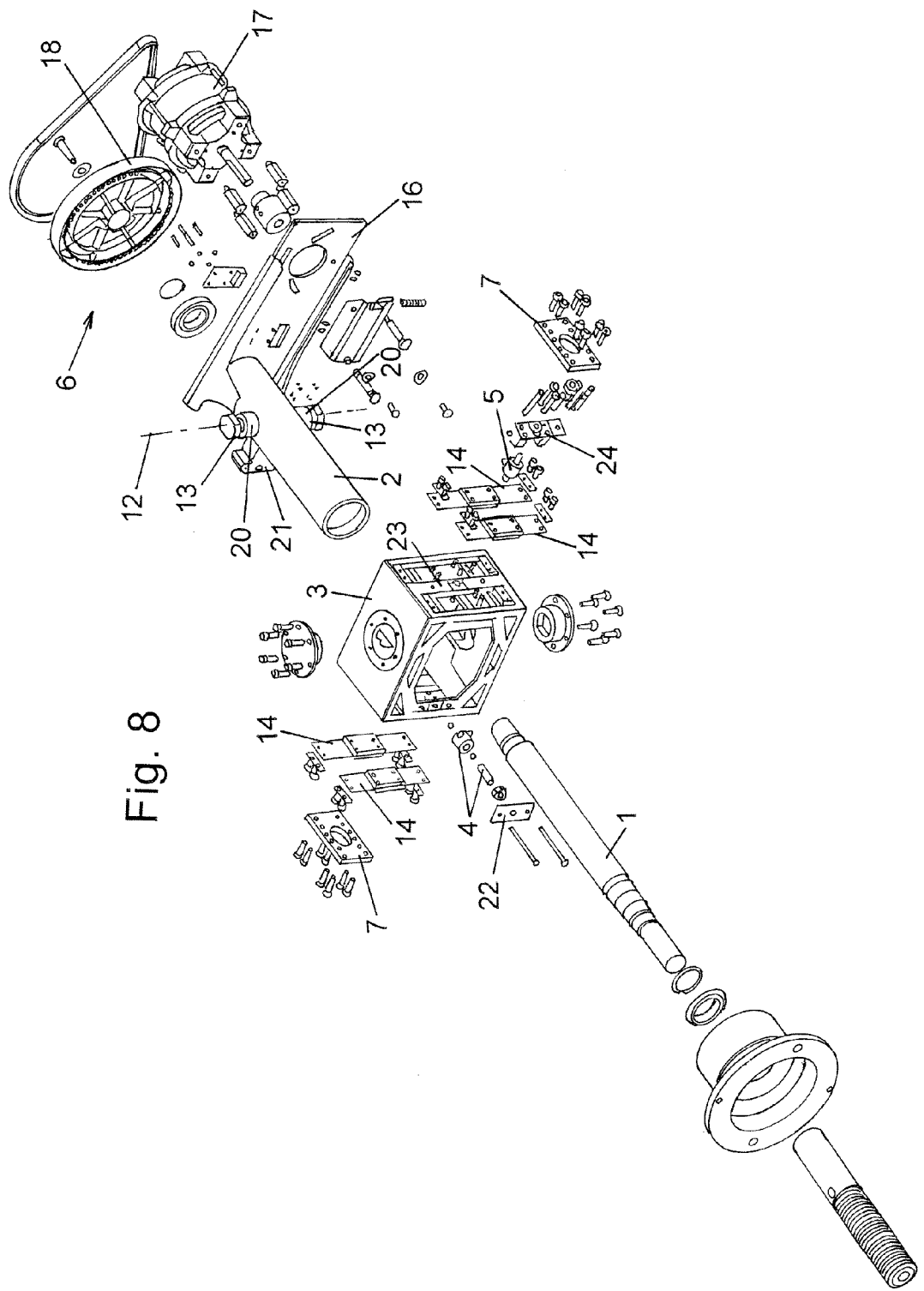

FIG. 8 an explosive view showing the components of the measuring device.

The embodiment shown in the Figures is a measuring device for measuring forces, especially centrifugal forces which are generated by an imbalance of a rotor 9 which is schematically shown in FIG. 6. The rotor 9 can have the configuration of a vehicle wheel which consists of a rim/tyre assembly. The rotor 9 is adapted to be balanced in one (static balancing) or two compensation planes 10, 11 (dynamic balancing).

The measuring device can be mounted in a stationary frame 7 which can be the housing of a wheel balancer adapted to balance vehicle wheels. The Figures show parts of the stationary frame 7 or parts which are rigidly connected to the stationary frame 7. Those parts are provided with the reference sign "7".

The measuring device comprises a first bearing 2 in form of a tube in which a measuring shaft 1 is mounted rotatably about its shaft axis 8. For this, the measuring shaft 1 is supported by means of roller bearings 19 within the tube-shaped first bearing 2. The measuring shaft 1 has in the region of its free end mounting means 15 which can be designed in known manner for attachment of the rotor 1, especially the vehicle wheel.

A second bearing 3 for the measuring shaft 1 has a rigid frame structure and supports pivotally the first bearing 2 about a pivot axis 12 (FIGS. 4, 7, 8). The pivot axis 12 is generated by spring means consisting of two torsion springs 13.

The torsion springs 13 are formed on mounting bolts 20 which are rigidly connected to the first bearing 2 and to the second bearing 3. The mounting bolts 20 extend diametrically from the surface of the tubular first bearing 2. The one ends (inner ends) of the mounting bolts 20 are connected to the first bearing 2 and the other ends (outer ends) of the mounting bolts 20 are connected to the second bearing 3. The torsion springs 13 are established by reduced diameters of the mounting bolts 20 between the inner and the outer ends of the mounting bolts 20. The torsion springs 13 are arranged with respect to the measuring shaft 1 such that the shaft axis 8 extends in the middle between the torsion springs 13 and the pivot axis 12 intersects the shaft axis 8 in a perpendicular angle.

The second bearing 3 is supported on the stationary frame 7 in a manner that a force measurement between the measuring shaft 1, particularly the second bearing and the stationary frame 7 is possible. For this, the second bearing 3 of the measuring shaft 1 is supported preferably by means of spring means which have the configuration of plate springs 14. The plate springs 14 are places on both sides of the shaft 1 and extend parallel to each other and perpendicularly with respect to the shaft axis 8. The plate springs on the both sides of the shaft 1 have equal distances from the shaft axis 8. The both ends of the plate spring 14 are rigidly, for instance by means of screw connections, connected to the frame structure of the second bearing 3. The plate springs 14 are rigidly, for instance by means of screw connections, connected in the middle of the extensions to the stationary frame 7 or to respective parts of the stationary frame.

The specific arrangement of the spring means 13 and 14 enables that the measuring shaft 1 can perform displacements in two degrees of freedom, namely a rotation about the pivot axis 12 and a translatory motion with respect to the stationary frame 7. The directions of the two displacements extend in one plane which passes through the shaft axis 8.

The rotary and translatory displacements of the measuring shaft 1 are measured by force sensors having measuring directions within the one plane in which extend the displacement directions of the measuring shaft 1. A first force sensor 4 measures forces generated by unbalance of the rotating rotor 9 and acting about the pivot axis 12. A second force sensor 5 measures forces generated by the unbalance of the rotating rotor 9 and acting on the shaft 1 and on the second bearing 3 in a direction intersecting the shaft axis 8.

The first force sensor 4 is positioned and tensioned between the first bearing 2 and the second bearing 3 (FIG. 4). The measuring direction of the force sensor 4 is inclined with a specific angle $\beta$ with respect to a direction perpendicular to the shaft axis 8, wherein the angle $\beta$ is determined in a range from 80° to 100°, preferably from 85° to 95°. In the illustrated embodiment, the angle $\beta$ is determined to about 90°, namely, in the illustrated embodiment the measuring direction of the first force sensor 4 extends parallel to the shaft axis 8. The rotary displacements of the shaft 1 are transmitted by a lever 21 which is rigidly fixed to the tubular first bearing 2. The rotary displacement of the shaft 1 is transmitted via the roller bearings 19 which are positioned at the ends of the tubular first bearing 2 (FIGS. 4, 7) to the first bearing 2 and via the lever 21 onto the one end of the force sensor 4. For this transmitting movement the lever 21 rotates about the pivot axis 12. The lever 21 extends along the one plane in which the measuring directions of the force sensors 4, 5 lie and extends perpendicularly with respect to the shaft axis 8. The other end of the force sensor 4 is rigidly supported on the second bearing 3 by means of a support plate 22 screwed with the second baring 3.

The second force sensor 5 is at its one end in force transmitting manner connected to a middle side portion 23 of the second bearing 3. The middle side portion 23 extends parallel to the plate springs 14 on the same side of the second bearing 3. The other end of the force sensor 5 is supported on a support bracket 24 which is rigidly connected, preferably by means of screw connections with the stationary frame 7 or a respective part of the stationary frame. The measuring direction of the second force sensor 5 is inclined by a specific angle $\alpha$ (FIG. 6) with respect to the shaft axis 8. The angle $\alpha$ can be determined in a range from 60° to 120°, for example from 65° to 115°, especially 70° to 110°. In the illustrated embodiment, the angle $\alpha$ is determined to about 75°.

A support member 16 is rigidly connected to the tubular first bearing 2. The support member 16 supports a driving motor 17, especially an electric motor, and transmission means 18, especially a belt transmission which transmits the motor torque onto the measuring shaft 1 for rotating the rotor 9 during the measurement.

The forces measured at special rotary angles with respect to the rotor 9 whose axis is coincident with the shaft axis 8 are used together with the known dimensional parameters of measuring device, especially the distances of the compensation planes 10, 11 from the pivot axis 12 to calculate balancing masses to be applied in one or in the two compensation planes 10, 11 (FIG. 6) of the rotor 9.

All components of the measuring device can be mounted and connected to form a pre-mounted measuring unit which is rigidly connected on both sides of the frame structure of the second bearing 3 to the stationary frame 7, preferably be screw connections, as explained above.

LIST OF PARTICULARS

1 measuring shaft
2 first bearing
3 second bearing
4 first force sensor
5 second force sensor
6 driving means
7 stationary frame
8 shaft axis
9 rotor (rim/tyre assembly)
10, 11 compensation planes
12 pivot axis
13 spring means (torsion spring)
14 spring means (plate spring)
15 mounting means
16 support member
17 motor (electric motor)
18 transmission means
19 roller bearings
20 mounting bolt
21 lever
22 support plate
23 middle side portion
24 support bracket

The invention claimed is:

1. A device for measuring forces generated by an unbalance of a rotating rotor, said device comprising:
   a stationary frame;
   a first bearing;
   a measuring shaft mounted rotatably about its shaft axis in the first bearing;
   a mount provided on the measuring shaft designed for attachment of the rotor, wherein the rotor is designed to be balanced in at least one compensating plane;
   a second bearing pivotally supporting the first bearing about a pivot axis which intersects the shaft axis and being supported on the stationary frame;
   a first force sensor for measuring forces generated by the unbalance of the rotating rotor and acting on the measuring shaft about the pivot axis; and
   a second force sensor for measuring forces generated by the unbalance of the rotating rotor and acting on the measuring shaft and on the second bearing in a direction intersecting the shaft axis; and
   a first spring provided between the first bearing and the second bearing, the first spring including one or ore torsion springs.

2. A device according to claim 1, wherein the first spring is configured to permit the pivotal displacement between the first bearing and the second bearing for enabling the first force sensor to perform the force measurement.

3. A device according to claim 1, further comprising a second spring provided between the second bearing and the stationary frame to permit a displacement between the second bearing and the stationary frame enabling the second force sensor to perform the force measurement.

4. A device according to claim 3, wherein the second spring has the configuration of plate springs.

5. A device according to claim 4, wherein the second spring extends in parallel arrangement perpendicularly to the shaft axis.

6. A device according to claim 5, wherein the plate springs are positioned on both sides with respect to the shaft axis.

7. A device according to claim 4, wherein the plate springs are rigidly connected to the stationary frame in a plane which includes the shaft axis.

8. A device according to claim 4, wherein the plate springs are rigidly connected in the middle of their extension to the stationary frame.

9. A device according to claim 1, wherein measuring directions of the first force sensor and of the second force sensor extend in one plane which passes through the shaft axis.

10. A device according to claim 1, wherein a measuring direction of the second force sensor is inclined with a specific angle ($\alpha$) with respect to the shaft axis, wherein the angle ($\alpha$) is determined in a range from 60° to 120° or from 65° to 115° or from 70° to 110°.

11. A device according to claim 10, wherein the angle ($\alpha$) is equal to about 75° or to about 105°.

12. A device according to claim 1, wherein the measuring direction of the first force sensor is inclined with a specific angle ($\beta$) with respect to a direction perpendicular to the shaft axis, wherein the angle ($\beta$) is determined in a range from 80° to 100° or from 85° to 95°.

13. A device according to claim 12, wherein the angle ($\beta$) is equal to about 90°.

14. A device according to claim 1, wherein the pivot axis intersects perpendicularly the shaft axis.

15. A device according to claim 1, wherein the second force sensor measures forces generated by the unbalance of the rotating rotor and acting on the measuring shaft and on the second bearing in a direction perpendicular to the pivot axis.

16. A device according to claim 1, wherein a support member supporting a motor and a transmission transmitting the torque of the motor to the measuring shaft is rigidly connected to the first bearing.

17. A device according to claim 1, wherein the first bearing has the form of a tube.

18. A device according to claim 1, wherein the first force sensor is placed between the first bearing and the second bearing.

19. A device according to claim 1, wherein the pivot axis about which the second bearing is pivotally supported is established by two of the one or more torsion springs, wherein the shaft axis extends in the middle between the two torsion springs.

20. Use of a device according to claim 1 in a tyre service machine.

* * * * *